United States Patent [19]

Burton

[11] 4,060,396
[45] Nov. 29, 1977

[54] WAFERED FUEL OF COMPRESSED WOOD PRODUCTS

[76] Inventor: James V. Burton, P.O. Box 749, Laramie, Wyo. 82070

[21] Appl. No.: 626,491

[22] Filed: Oct. 28, 1975

[51] Int. Cl.² .......................... C10L 5/36; C10L 11/00
[52] U.S. Cl. ......................................... 44/14; 44/10 B; 44/10 H; 44/38
[58] Field of Search .................... 44/2, 14, 10 B, 10 H, 44/11–13, 41, 6, 38

[56] References Cited

U.S. PATENT DOCUMENTS

| 1,747,919 | 2/1930 | Welton | 44/14 |
| 1,780,205 | 11/1930 | Maurel | 44/14 |
| 2,007,694 | 7/1935 | Rutherford | 44/41 |
| 2,011,971 | 8/1935 | Erickson | 44/14 |
| 2,222,250 | 11/1940 | Bowling | 44/14 |
| 2,833,633 | 5/1958 | Hecht | 44/13 |

OTHER PUBLICATIONS

W. Va. So. Coal Co., TM243,573, June 1928.

Primary Examiner—Carl F. Dees

[57] ABSTRACT

A fuel made of a major portion of compacted wood particles as a log of an integrated array of interlocking, disc-shaped wafers, which may be separated from the log to be used as individual briquettes. The log may be modified by providing a star-shaped, hollow passage through it and through each wafer, to enhance the burning rate and to make lighting the log a simple, quick operation.

3 Claims, 9 Drawing Figures

WAFERED FUEL OF COMPRESSED WOOD PRODUCTS

The present invention relates to combined fuel-cooked logs, and more particularly to an improved fuel, in one form, made solely from compacted wood products, and in other forms may also include coal particles and other organic matter. Thus, the term "fuel-cooked log or wafer," as hereinafter used, will mean a fuel including compacted wood particles.

A considerable amount of waste wood is produced at any sawmill, such as bark, sawdust, chips and slabs. This waste wood is often disposed of by burning, but it is, also, a common practice to blend the chips with binders and compress the same into fuel logs for burning in fireplaces. Such fuel logs are formed by compression of wood chips and sawdust under intense pressure and heat. The binder is normally used in this operation so that the wood particles will hold together.

A common, but comparatively new machine for forming compressed fuel logs is an extrusion apparatus. The waste wood, which consists of trim bark, slabs, sawdust and shavings, is normally first run through a preliminary grinder and then through a final grinder, a hammermill. The product is then a variety of sizes up to about one-fourth inch long. Fine particles of sawdust and the courser particles may be compressed to form the fuel with additives. Heat is required for this operation and a substantial portion of the heat will be generated during compression in the extrusion apparatus. If additional heat is required, the extrusion apparatus can be heated in any conventional manner.

The extruding apparatus receives a feed mixture, which is tightly compressed and briquetted in the head of the extruding apparatus by a ram pushing a charge against a log or billet being formed in the apparatus. This billet is thus continuously extruded from the apparatus. Finally, as the billet cools it is cut off at selected lengths.

The present invention is concerned with improvements in such an extrusion operation to produce an improved product, which, in one form, may be described as a fual-cooking log made up of an interlocking array of disc-shaped wafers, each wafer consisting of an individual charge of wood particles which is compressed in the head of the extruding machine as the billet is being formed, all in a conventional manner. Other forms require a mixture of feed, a major portion of wood products with other matter, such as coal, waste, etc. It was discovered that if the plunger of the extruding apparatus were concaved, instead of being flat or convex as is the common practice, the charges of wood particles or feed mix would not completely weld together and to the billet to form a continuous solid log as occurs in conventional operations. Instead, these charges would form individual wafers which interlock only to a degree sufficient to hold the fuel log together, but permit their easy separation, if desired. The concave plunger would produce a concavity at one face of each disc-shaped wafer and a convexity at the other face which was not at all objectionable.

When thus formed, a fuel log, may be of any selected length or may also be easily broken down into its individual concaved wafers as for stoker fual. The advantages of this construction of a fuel log are immediately apparent since the wafers, the size of small briquettes of compressed wood particles or a mixture of wood particles and coal particles or the like, may be separated from the log and burned in the same manner as charcoal briquettes or coal lumps. The wafers, made of wood only, may also be used for food grilling purposes in place of charcoal briquettes. The smoke they produce, being of wood, imparts a deep smoke flavor to cooked foods.

The invention further contemplates the use of a mandrel outstanding from the extrusion plunger to extend into the billet and form an axial hollow passage in the fuel logs. The hollow passage in the log enhances the burning of the log by functioning as a ventilating passageway increasing the surface area and acting somewhat as a miniature chimney. It was discovered that a star-shaped mandrel having sharp corners was especially effective in this regard, making the fuel log, or wafers separated therefrom, easy to ignite. In fact, for fireplace purposes, this hollow core fuel log may be used as a starter to get other logs burning.

It follows that an object of the invention is to provide a novel and improved fuel log, having the form of a cylindrical member, which is capable of being broken or separated into a number of disc-shaped wafers.

Another object of the invention is to provide a novel and improved fuel log which is formed with a hollow, star-shaped core which is especially easy to ignite.

Another object of the invention is to provide a novel and improved method for making a fuel log formed as an array of tightly-knit wafers in a simple, easy manner.

Another object of the invention is to provide a novel and simple alteration to a conventional extrusion machine for producing fuel logs as an array of closely-knit, but separable, wafers in a manner which does not add to the cost of manufacturing of the fuel logs.

Another object of the invention is to provide a novel and improved method for making a fuel log having a hollow core of a selected, star-shaped section.

Another object of the invention is to provide combined fuel-cooking logs formed only of wood products.

Another object of the invention is to provide a fuel log composed of compressed wood products and powdered coal providing superior heat and burning qualities.

Another object of the invention is to provide separate wafers containing wood products, and preferably coal particles useful for industrial heating, boilers and the like, through stokers and other automatic and semi-automatic feed units for the burners of such units.

With the foregoing and other objects in view, my present invention comprises certain constructions, combinations and arrangements of parts and elements as hereinafter described, defined in the appended claims, and illustrated in preferred embodiment in the accompanying drawing in which:

Figure 1:
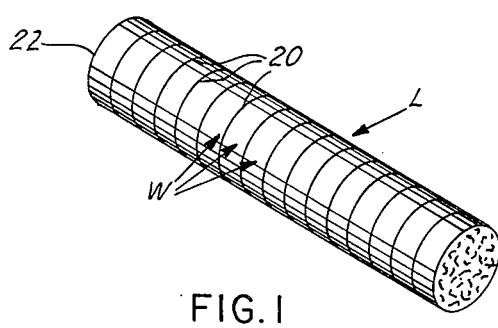
FIG. 1 is an isometric view of a fuel log made of compressed wood particles as an array of interlocking wafers in accordance with the present invention.
Figure 5:
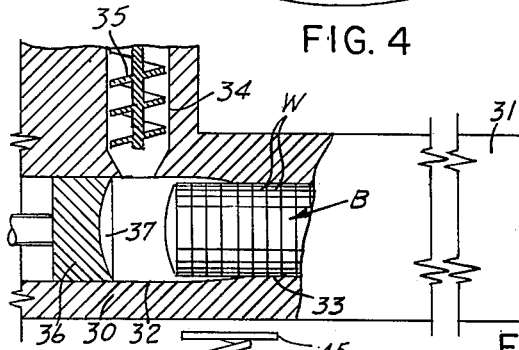
FIG. 5 is a diagrammatic view, partially in section and with portions broken away to conserve space, of a machine for extruding a wafered fuel log according to the present invention.

Referring more particularly to the drawing, FIG. 1 illustrates a fuel log L (which is of a similar size to a conventional, cylindrical fuel log) formed as an interlocking array of wafers W which show on the log as a sequence of rings 20 where the wafers join each other. This log L may have a diameter of three or four inches and a length of from one to two feet so that it is suitable for use in a fireplace. The elongated, cylindrical log L is formed, in one form, solely of compressed wood particles without binders as heretofore mentioned, and by an extrusion apparatus hereinafter described. The logs may, also, be formed of mixtures of wood products, coal products or other combustible matter. It is to be noted that the cylindrical wall of this log is smooth, typical of a product formed by extrusion through a smooth die. The ends of the log L include a concave leading end 21, and a convex trailing end 22, so designated with respect to its movement through the extrusion apparatus. These ends are not smooth, but are irregular since they are produced by separating the log from an elongated billet being continuously extruded from the die, as shown at FIG. 5. The separation surface is normally at the interface between two wafers W.

Figure 2:
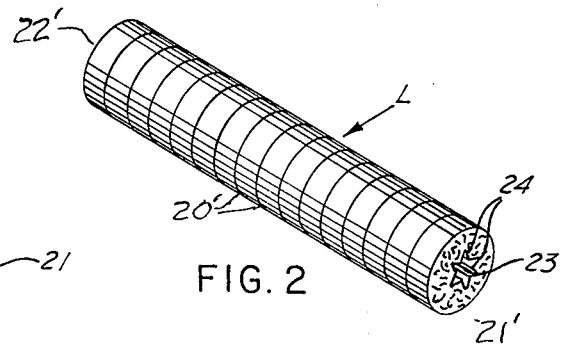
FIG. 2 is an isometric view, similar to FIG. 1, but showing a fuel log having a hollow, star-shaped passage extending longitudinally through the log.

The fuel log L', shown at FIG. 2, is essentially identical to the fuel log L above described, in that it is formed as an array of interlocking wafers W' and a sequence of rings 20' appear where the wafers join each other. The leading end 21' is concave and the trailing end 22' is convex. This fuel log L' also includes a hollow, star-shaped passage 23. The passage 23 is formed by a mandrel which is carried on the plunger within the extrusion die as hereinafter described. This star provides for internal surfaces, increasing total surface area of the wafer, terminating at internal points 24 which are very easy to light since the wood particles at these points may not be compressed as tightly as the wood particles are otherwise compressed. Also, the core can form a flue, or chimney, to create a draft and facilitate burning as heretofore mentioned.

Figure 4:
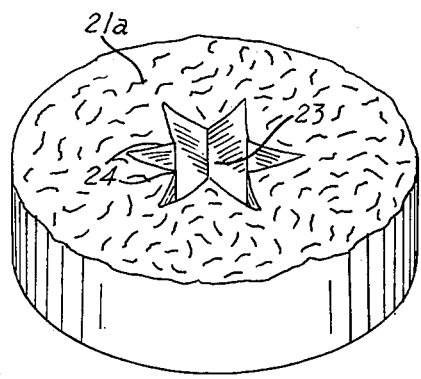
FIG. 4 is a perspective view of an individual wafer such as that broken away from the partial fuel log shown at FIG. 3.
Figure 3:
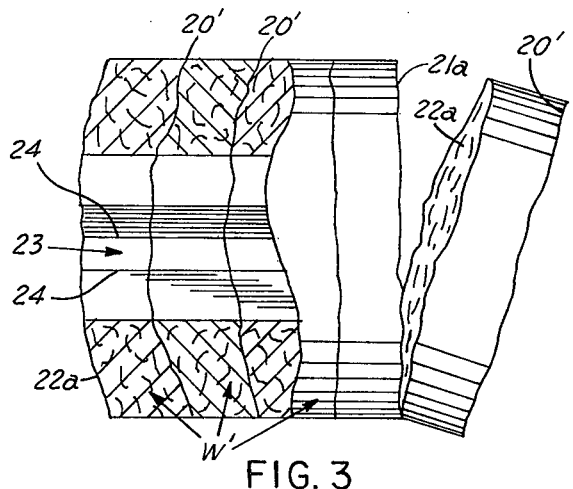
FIG. 3 is a side elevational view, partially in section, of a portion of the fuel log shown at FIG. 2, but on an enlarged scale with a wafer being partially broken away, indicative of the manner in which the wafers may be separated from the fuel log.

The wafers W and W' which interlock to form the respective logs L and L' are generally disc-shaped, having a thickness of approximately one-third to one-fourth the diameter of the log depending upon the amount of material fed into the extrusion apparatus during each compressive cycle as the billet is formed. Each wafer W and W' is disc-shaped and is concave and its leading face and convex at its trailing face. These faces are shown for the log L' as 21a' and 22a' at FIGS. 3 and 4. The wafers are formed in this concave-convex manner by the plunger within the extrusion apparatus which is concaved, as hereinafter described. Whenever a wafer W is formed under pressure with the plunger shaping the convex surface 22a, that surface is at first smooth and regular; however, during subsequent, compressive operation, as when the next wafer in the billet is being formed, this smooth surface becomes quite irregular because of differences in the yield of wood particles as the materials are tightly compressed. When so compressed, the convex surface 22a of one wafer and the concave surface 21a of the next adjacent wafer are bonded together. Nevertheless, this interface between the two wafers can become a parting surface to permit the wafers to be separated at these surfaces without undue effort, such separation being illustrated at FIG. 3.

The extrusion apparatus E, which forms the fuel logs above described in connection with FIG. 1, is diagrammatically illustrated at FIG. 5. The extrusion apparatus E includes a head section 30 where the sawdust is compressed and an extrusion die 31 extends therebeyond. A cylindrical receiving chamber 32 in the head of this apparatus is axially aligned with the cylindrical passageway 33 through the extrusion die 31, although the chamber 32 may be slightly greater in diameter than the passageway 33 through the extrusion die. This difference in diameter requires the material in the receiving chamber 32 to be tightly compressed when it is pushed through the extrusion die.

An infeed passageway 34 extends to the receiving chamber 32 and wood material or mixed feed material from any suitable supply container, such as a hopper, not shown, is moved through this passageway by a spiral flight 35. A plunger 36, a piston, reciprocates within the receiving chamber 32 to move a charge of feed material therein, supplied by the infeed 34, against the trailing end of a billet B being formed in the passageway. As the plunger 36 moves towards the billet B, the charge of feed material is compressed into a wafer W which coalesces with the trailing end of the billet, and as a final cycle of movement, the billet is shifted forwardly. This compressive movement produces a substantial quantity of heat, and the wafer and the billet are heated to the point where the compressed feed material congeal. Additional heat may be provided, if needed, and this may be accomplished in any suitable, conventional manner which need not be described.

The plunger 36 has a concaved contact face 37 which provides for the convexed trailing end 22 of the logs, and the billet formed in the die. As heretofore noted, this concave face 37 is unique in that the produced heat and compressive action against the wood chip material causes the wood to form relatively solid wafers, but these wafers are not welded solidly to the billet B in the extrusion die passageway. Instead, the wafers are secured together in a manner which permits a subsequent parting as above described.

Figure 6:
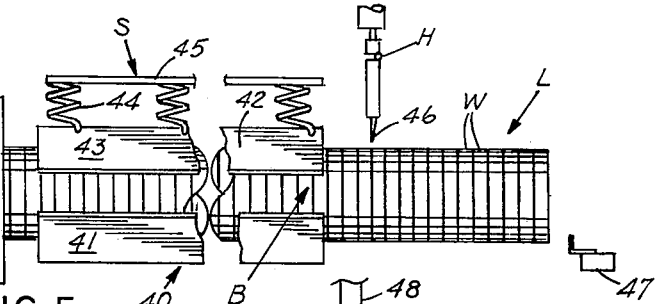
FIG. 6 is a transverse section as taken from the indicated line 6—6 at FIG. 5.
Figure 6:
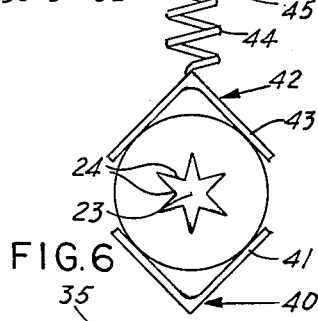
Figure 7:
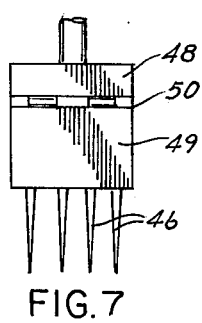
FIG. 7 is a transverse view of a break-away tine used in the machine depicted at FIG. 5.

As the billet is ejected from the extrusion die 31, it is quite hot due to the high compression (about 7 to 1), and must be cooled before it can be handled. Accordingly, it moves through a cooling sleeve S. This sleeve includes a base way 40, formed as an angle bar, held by any suitable support, not shown, with the billet sliding between the legs 41 of this angle as best shown at FIG. 6. A capway 42, also formed as an angle bar, overlies the billet with the billet sliding between the legs 43 of this angle. Springs 44, secured to a suitable carrier 45, hold this capway in place with resilient pressure against the billet.

The length of the cooling sleeve S is such that the billet may cool to a suitable temperature before it is broken into selected lengths, from single wafers to multiple wafers. It is contemplated that this cooling action may be supplemented by a fan refrigeration or the like which is not shown. Further, the cooling is enhanced by means of the hollow passage in the billet.

Figure 8:
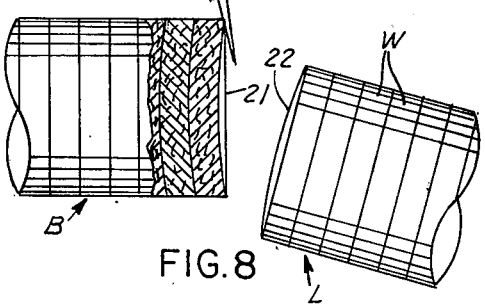
FIG. 8 is a fragmentary detail, on an enlarged scale, showing the break-away tines in use.

The cut-off mechanism, a cutter head H to obtain desired lengths of fuel logs from the billet, will take advantage of the fact that the interlocked wafers W may be parted without undue effort. Thus, the cutter head H is provided to carry an array of tines 46 which are thrust into the billet at a suitable space between selected wafers to effect the cutting operation. The mechanism to move this cutter head H towards the billet, not shown, is actuated by a limit switch 47 whenever the billet progresses to a selected point where a fuel log of a selected length extends beyond the cooling sleeve. This head includes a comparatively rigid body 48 and only a portion of this body is shown in the drawing. The body includes a lower portion 49 carrying the tines 46. The lower portion 49 is hinged to the body, as at 50, so that it may swing out of the way as the billet continues to move outwardly after a log is broken away and before the cutterhead H is retracted, as shown at FIG. 8.

Figure 9:
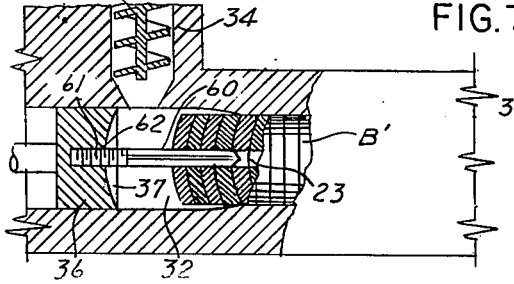
FIG. 9 is a fragmentary sectional detail similar to a portion of the showing at FIG. 5 to depict the use of a mandrel in forming a hollow core in a fuel log such as that illustrated at FIGS. 2, 3 and 4.

FIG. 9 illustrates the manner in which a mandrel 60 is mounted upon the plunger 36 within the extruding apparatus to provide a hollow passage in the billet B' formed within the apparatus. Preferably, this passage is star-shaped as heretofore described, preferably a six-pointed star, but may be of other star configurations as desired. The mandrel 60 is a straight, axially-centered member with the blade portion having the desired star shape. The base 61, however, is cylindrical and is threaded so that it will fit into an axially-centered socket 62 in the concave face 37 of the plunger 36. The length of the mandrel is such that it will extend into extruding die and into a billet B' being formed therein a distance sufficient to cause the passage to retain its hollow, star shape throughout the extrusion process and in the completed fuel logs L' produced by the operation.

It has been found that the logs made of only wood products, without a binder or other additive, are excellent fuel pieces for fireplaces, stoves or the like. Such fuel pieces may, also, be used for cooking in place of charcoal briquettes producing an excellent wood smoke flavor in the cooked meat. The wafers provide a slightly cooler fire, lessening possible burning of the food. Further, the fire is ready for cooking some half hour or more before charcoal. The logs may be broken into pieces of one, two or more wafers thick for producing different tines of heat for cooking (thicker pieces burning longer than the single wafers).

For heating only, coal dust, powder or mixed size granules may be added to the wood particles in an amount of from 5 to 50% by weight, to produce a hot, longer-lasting log. Additionally, such logs or wafers with the coal added do not dust, spall or slake as do ordinary coal lumps, and they may be handled with minimum dirtying of the hands. Other organic material may be added to the wood for making logs for heating. For stoker fuel, the product may be used as individual wafers or the wafers broken up.

The structure of the fuel logs L and L', the structure of the wafers W and W', the manner in which the wafers may be separated from the fuel logs and the manner in which these fuel logs may be manufactured to obtain the separable wafers is apparent in the foregoing description. Nevertheless, it is obvious that others skilled in the art can devise and arrange alternate and equivalent constructions and operations which are within the spirit and scope of the present invention, as exemplified by the foregoing description. Hence, it is desired that my protection be limited not by the details herein set forth, but only by the proper scope of the appended claims.

What is claimed is:

1. A fuel in a cylindrical form of selected length comprising:
    a plurality of relatively thin wafers arranged as an interlocking array of disc-shaped wafers including a major portion of wood particles without binders, with each wafer being a discrete member having one concave end and one convex end arranged to nest with a neighboring wafer,
    each said wafer having a pointed star shaped central passage; and
    the particles of each wafer being compressed together so as to tightly adhere to each other with the wafers only lightly adhered to an adjacent wafer so as to permit easy breaking of the fuel into discrete wafers.

2. The fuel of claim 1, wherein:
    said wafers are formed of only wood particles.

3. The fuel of claim 1, wherein:
    coal particles in an amount of from 5– 50 weight percent is added to the wood particles prior to being compressed together thereby forming wafers of only wood particles and coal particles.

* * * * *